United States Patent
Pappalardo et al.

(10) Patent No.: US 7,313,332 B2
(45) Date of Patent: Dec. 25, 2007

(54) METHOD OF TRANSMITTING DATA STREAMS ON OPTICAL LINKS AND SYSTEM AND COMPUTER PROGRAM PRODUCT THEREFOR

(75) Inventors: Francesco Pappalardo, Paternò (IT); Giuseppe Visalli, Messina (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 616 days.

(21) Appl. No.: 10/830,490

(22) Filed: Apr. 21, 2004

(65) Prior Publication Data
US 2004/0223767 A1 Nov. 11, 2004

(30) Foreign Application Priority Data
May 7, 2003 (EP) .................................. 03010238

(51) Int. Cl.
*H04B 10/04* (2006.01)
(52) U.S. Cl. .................................................. 398/183
(58) Field of Classification Search ................ 398/183, 398/190–191, 174, 182, 189; 341/58, 50–51, 341/55; 714/809
See application file for complete search history.

(56) References Cited

U.S. PATENT DOCUMENTS 5,539,846 A * 7/1996 Morikura et al. ............. 385/24
5,606,317 A * 2/1997 Cloonan et al. ............... 341/58
6,963,697 B2 * 11/2005 Gurusami et al. ........... 398/202
7,016,606 B2 * 3/2006 Cai et al. ...................... 398/27
2002/0126359 A1 * 9/2002 Gnauck et al. .............. 359/173
2003/0099011 A1 * 5/2003 Murakami ................... 359/115

FOREIGN PATENT DOCUMENTS

EP          1380961 A1        1/2004

OTHER PUBLICATIONS

European Search Report for EP, No. 03010238.8 of Oct. 8, 2003.
IBM Corp. "Group Encoding Method for Infrared Communication" IBM Technical Disclosure Bulletin, IBM Corp, New York, U.S. vol. 28, No. 10, Mar. 1986, pp. 4440-4441.

* cited by examiner

*Primary Examiner*—Jason Chan
*Assistant Examiner*—Quan-Zhen Wang
(74) *Attorney, Agent, or Firm*—Hogan & Hartson LLP

(57) ABSTRACT

A data stream (b(t)) including high ("1") and low ("0") logical states is transmitted over an optical link by means of an optical source adapted to be driven via the data strema, to generate an optical signal for transmission over the optical link. The optical signal includes optical pulses generated at the occurrence of high logical states in the data stream b(t). The input data stream b(t) is coded into a coded data stream B(t) prior to the transmission over the optical link. The coding step minimizes the logical high states in the coded data stream, and the optical source is driven by means of the coded data stream wherein the number of logical high states has been minimized.

24 Claims, 5 Drawing Sheets

METHOD OF TRANSMITTING DATA STREAMS ON OPTICAL LINKS AND SYSTEM AND COMPUTER PROGRAM PRODUCT THEREFOR

BACKGROUND OF THE INVENTION

1. Field of the Invention

The present invention relates to techniques for reducing power consumption and was developed by paying specific attention to the possible application in optical telecommunications systems of the on-chip integrated type. However, reference to this preferred application is in no way to be construed as limiting the scope of the invention.

2. Description of the Related Art

In modern telecommunications systems, optical fibers are extensively employed as the physical layer for transmission channels. Optical fibers are in fact adapted to transmit very high frequency carriers and, by virtue of the large useful bandwidths associated to such carriers, a plurality of communication channels can be multiplexed for simultaneous transmission on a single fiber.

Optical fiber telecommunication systems are particularly simple, as they generally comprise a source such as a laser or an LED for generating modulated optical signals, at least one fiber into which the optical signals are injected to be propagated along the fiber, and a photo detector device such as a photodiode to detect the optical signals propagated along the fiber. At present, these arrangements are mostly obtained by using discrete components; however on-chip integration of those systems appears to be a promising perspective.

Such integrated systems have to cope with some basic technological issues. One of these is related to the possible need of subjecting the signal(s) to electro-optical and opto-electrical conversion to be processed. Such a conversion step inherently limits the transmission bandwidth. Moreover, attenuation introduced by the optical fiber and various noise sources play a role in making demodulation at the receiver a critical process.

In the specific context considered, operation of an optical fiber communications system generally involves multiplexing various signals streams received in parallel on an electrical bus to form a very high rate serial signal. This signal is then used to on-off modulate a light source to generate the optical signal to be injected into and propagated along the fiber.

FIG. 1 shows the typical layout of a telecommunications system embodying the principle of operation mentioned in the foregoing.

Such a system can be represented as comprising a transmitter, indicated as a whole as 10, a receiver, indicated as a whole as 20, and an optical waveguide or fiber 16 arranged therebetween.

The transmitter 10 includes a parallel-to-serial converter 12. The converter 12 receives from an electrical bus 11 an input data stream b(t) arranged over N parallel lines at a frequency (bit rate) $f_0$, operates conversion of the signal from parallel to serial and thus generates a serial data stream at a frequency (bit rate) $Nf_0$.

The serial bitstream is supplied to a laser driver 14 adapted to drive on optical source such as a laser diode 15. The laser diode generates an optical signal corresponding to the serial bitstream with bit rate $Nf_0$ and adapted to be injected into the optical fiber 16.

At the other end of the optical fiber 16, the receiver 20 includes a photodetector 21, for the opto-electrical conversion of the optical signal propagated along the fiber 16, followed by an amplifier 22 and a comparator (threshold detector) 23.

Downstream of the detector 21 a (virtually) identical replica of the serial signal supplied to the optical source 15 is produced.

The signal in question being designated "virtually" identical is obviously intended to take into account the error intrinsically involved in the transmission/detection process.

The signal from the comparator 23 is sent to a serial-to-parallel converter 24 acting essentially as a de-multiplexer adapted to derive—from the serial bitstream received with bit rate $Nf_0$—a number N of parallel bitstreams each with bit rate $f_0$ that virtually correspond to the input data stream b(t).

From the parallel-to-serial converter 12 a clock signal CK at a frequency $Nf_0$ is derived to be fed to an optical source such as a laser diode 15' driven by a corresponding laser driver 14' to be injected into an optical fiber 16'. At the output end of the fiber 16', the optical signal is received by a photodetector 21', followed by an amplifier 22' and a comparator 23' and supplied to the clock input of the serial to parallel converter 24, in order to drive in a correct way the operation of conversion.

Those of skill in the art will appreciate that the fibers 16, 16' may in fact be the same fiber with the optical source/photodetector pair 15, 21 operating at a different wavelength with respect to the optical source/photodetector pair 15', 21', according to what is currently known as a WDM (Wavelength Division Multiplex) format.

Data on the electrical bus 11 are transmitted on an integer number N of lines. Therefore, parallel-to-serial conversion leads these data to be converted to a frequency N times the frequency of the clock signal associated to the electrical bus 11. The clock signal CK, at a frequency $Nf_0$, is transmitted on the optical fiber 16' to permit proper recovery of the data in the reception stage by ensuring the correct synchronization of the detection process.

In the arrangement described, the modulation format adopted for the optical source 15 is of an on-off or OOK (On/Off Key) type.

FIG. 2 shows an exemplary behaviour as a function of time t of the optical power $P_0(t)$ impinging on the photodetector 21, while FIG. 3 shows the corresponding time behaviour of the current l(t) at the output of the photodetector 21. The logical levels of the input signal are "0" and "1".

The modulated optical signal power $P_0(t)$ can be expressed as:

$$P_0(t) = P_M \cdot \sum_k b_k \cdot p(t - kT) \quad (1)$$

where $P_M$ indicates the power emitted by the laser source, $b_k$ is a binary coefficient and p(t) the signal expressing the pulse shape. This is therefore a baseband PAM modulation (Pulse Amplitude Modulation), where the elementary ideal impulse response is constituted by a rectangular impulse.

Therefore, in a system as shown in the foregoing the laser source is switched on in correspondence to high logical states of the signal to be modulated.

In bus technology, as currently adopted e.g. in microprocessor-based processing systems, various solutions are known that reduce switching activity on the electrical bus.

For instance, in European patent application 02425456.7, a so-called "bus invert" method is disclosed based on the following operating principle.

If b(t) indicates the input data stream, the coded data stream B(t) used for transmission over the bus is generated according to the relationship:

$$[B(t), INV] = \begin{cases} b(t), 0 & H[b(t) \oplus B(t-1)] < N/2 \\ \overline{b(t)}, 1 & \text{otherwise} \end{cases} \quad (2)$$

where H is a Hamming distance function for counting the transitions involved in passing from B(t−1) to B(t), and INV is a signal transmitted on an additional line to inform the receiver as to whether the data transmitted are encoded or not.

The technique in question therefore measures a number of switching events—called switching activity (SA)—that would take place if the data without coding were transmitted. If such switching activity SA is lower than N/2, the input data stream b(t) is transmitted without encoding; otherwise its inverted value is transmitted. Such technique guarantees that the switching activity SA on the bus is always lower than N/2.

Another solution known in connection to electrical buses it is a method called 'bus switching'.

This is essentially an integrated technique of swapping and coding the input data stream b(t). The parallel electrical bus having N lines is divided in a plurality of identical "clusters" of M lines each. The bus switching method provides for choosing an optimal sequence of swapping p that minimizes the total switching activity SA. The encoder output i.e. the coded data stream B(t), is function of the input data stream b(t) and of the optimal sequence of swapping p, through a swapping operator S:

$$B(t)=S(b(t), p) \oplus S^{-1}(B(t-1), p) \quad (3)$$

The swapping operator S applies the sequence of swapping to every cluster of the parallel bus.

OBJECT AND SUMMARY OF THE PRESENT INVENTION

The object of the present invention is thus to provide an arrangement for reducing power consumption in optical fiber telecommunications system, especially in those on-chip integrated systems that have been described to some extent in the foregoing.

According to the present invention, the above object is achieved by means of a method having the characteristics referred to specifically in the claims that follow. The invention also relates to a corresponding system, as well as to a computer program product directly loadable in the memory of a computer and comprising software code portions for performing the method of the invention when the product is run on a computer.

Substantially, the solution according to the invention is based on techniques for minimizing the number of logical ones transmitted by the laser source, thus reducing the power absorption of the optical source that generates the optical signals injected and propagated along the fiber.

In practice, the arrangement disclosed herein is based on the recognition that if a set S of binary sequences is available, the optimum sequence that minimizes the power emitted by the laser is that sequence that includes a maximum number of "0's". This means that, in order to minimize the power emitted by the laser, the number of "1's" in the data stream must be minimized.

A preferred embodiment of the invention relies on reducing the power absorption of the optical source (e.g. a laser diode), by suitably coding the signal entering the parallel to serial converter.

BRIEF DESCRIPTION OF THE DRAWINGS

The invention will now be described, purely by way of non-limiting example, with reference to the attached drawings, in which:

FIGS. 5, 5A and 5B are block diagrams of three different embodiments of an encoder for the telecommunication system of FIG. 4.

DETAILED DESCRIPTION

By way of introduction to the detailed description of certain preferred embodiments of the invention, it is worth recalling that those disclosed in the following are just some possible ways of performing a coding step that minimizes the number of first logical states (e.g. "1's") in a coded data stream. Those of skill in the art will promptly appreciate that any other techniques adapted to pursue such a goal (starting from e.g. a simple majority count of "0's" and "1's" in the original data stream followed by logical inversion if "1's" are found to be the majority to more sophisticated coding schemes) are adapted to be used within the context of the invention.

Figure 1:
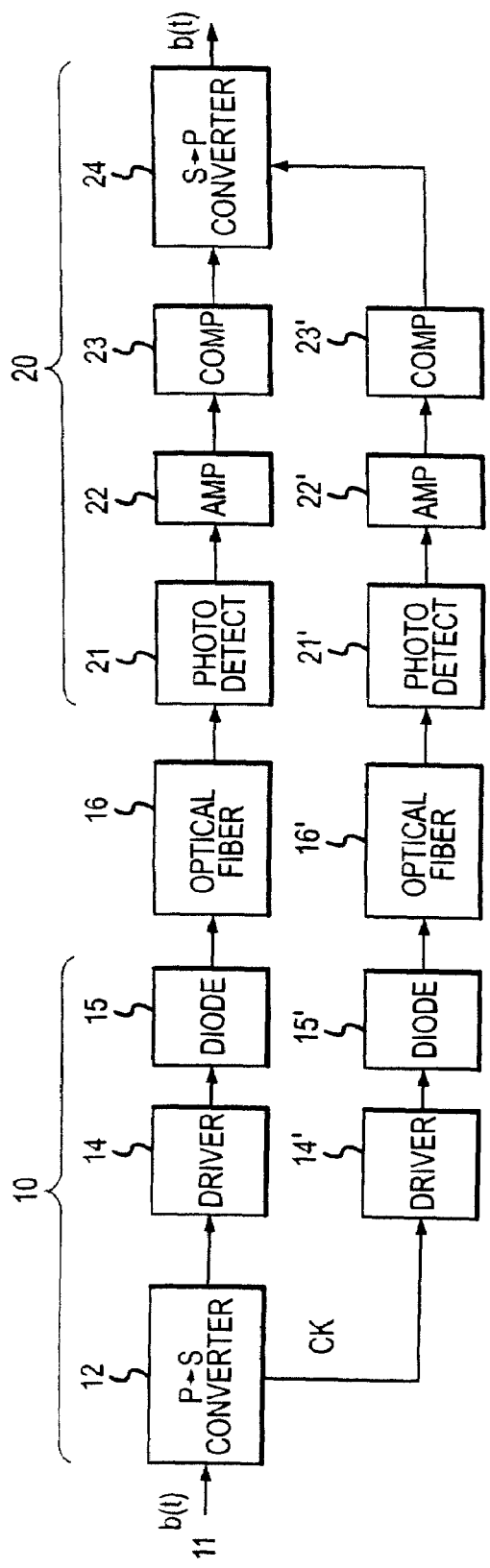
FIG. 1 shows a typical layout of a telecommunications system as described in the Background of the Invention.
Figure 2:
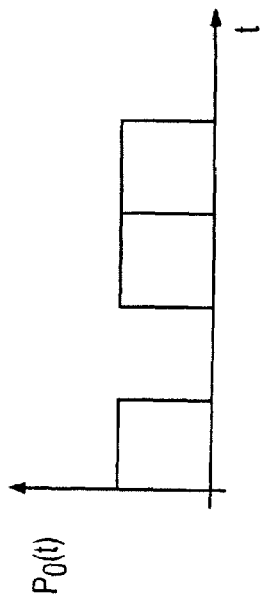
FIG. 2 shows an exemplary behaviour of a telecommunications system of FIG. 1 as a function of time of optical power $P_0(t)$ impinging on a photodetector, as described in the Background of the Invention.
Figure 3:
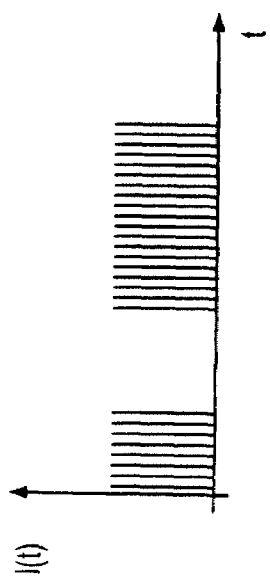
FIG. 3 shows time behaviour of the current l(t) at the output of the photodetector of a telecommunications system of FIG. 1, as described in the Background of the Invention.

In FIGS. 4 to 10 those parts or elements that are identical or equivalent to parts or elements already described in connection with FIG. 1 are indicated by the same reference numerals already appearing in FIG. 1, thus making it unnecessary to describe those parts or elements again.

Additionally, wording such as "optical", "light", and the like will be used throughout description herein and the claims that follow with the meaning currently allotted to those terms in fiber and integrated optics, being thus intended to apply to radiation including, in additional to visible light, e.g. also infrared and ultraviolet radiation.

Figure 4:
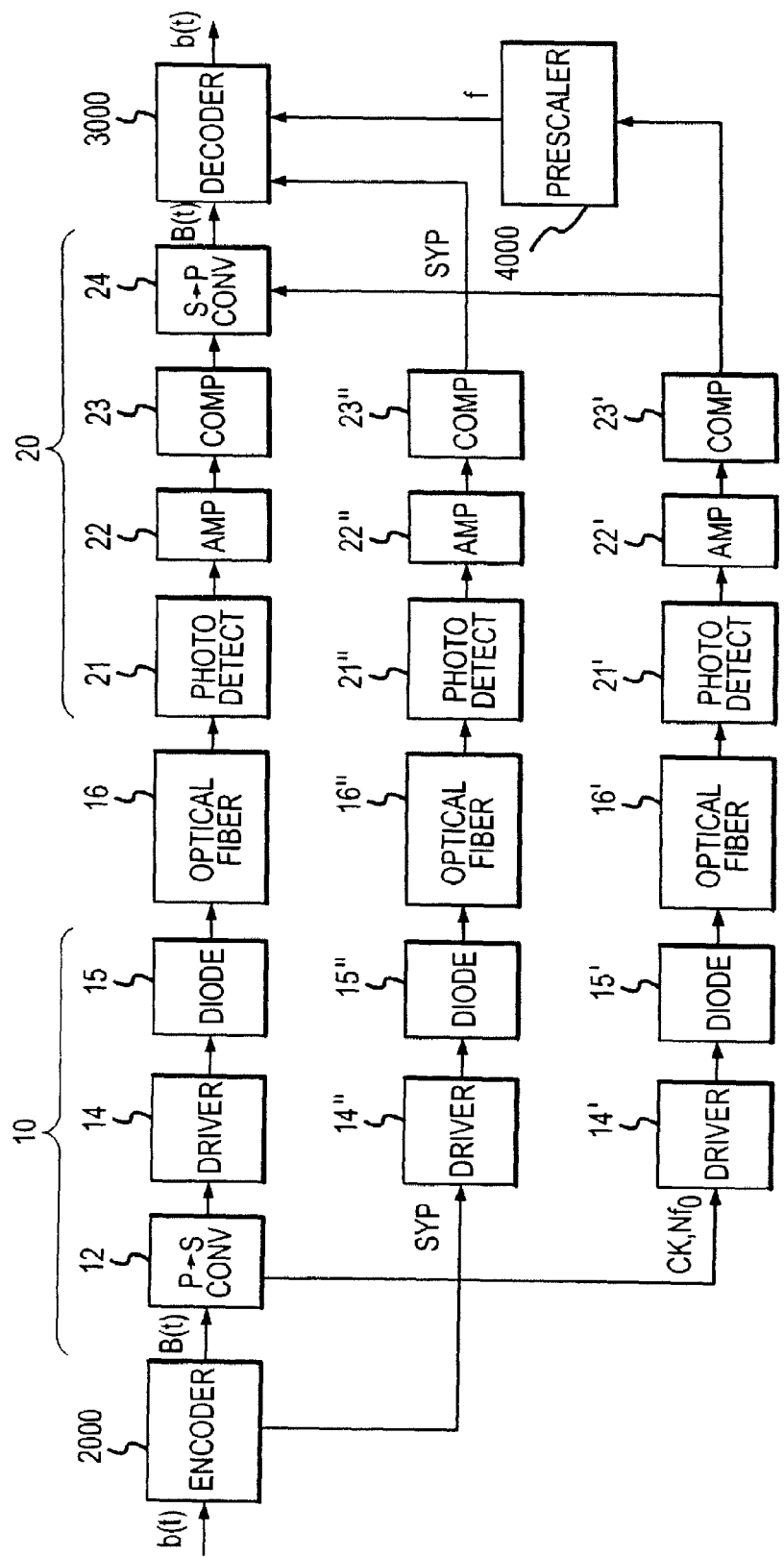
FIG. 4 represents a block diagram of a telecommunication system adapted to embody the invention.

In a first embodiment of the solution described herein, the electrical bus comprising N lines conveying (in a parallel format) the signal b(t) to the transmitter 10—see FIG. 4—is divided into several identical clusters comprising M lines. The number of clusters P therefore is P=N/M, with P being an integer number: this does in no way represent a limitation since the current values for M usually provide for M being a power of two.

By indicating with $\underline{S}$ the vector of the possible binary sequences of M bits, that are $2^M$:

$$\underline{S} = (S_0, S_1, S_2, \ldots, S_{2^M-1}) \quad (4)$$

an optimal sequence will exist corresponding to the maximum number of logical "1s" on all the bus lines being cancelled out (erased), which is a sequence for which the number of logical ones on all the bus lines is at a minimum.

For each cluster m, the output of the coder $B(t)_m$ is the XOR function of cluster $b(t)_m$ and an attempt sequence $S_n$:

$$\left[ B(t)_m = b(t)_m \oplus S_n \begin{cases} m = 0, \ldots, P-1 \\ n = 0, \ldots, 2^{M-1} - 1 \end{cases} \right. \quad (5)$$

The optimal sequence $\hat{S}$ produces an output B(t) containing a minimum of logical ones in the stream of bits.

$$B(t) = [b(t)_0 \oplus S, b(t)_1 \oplus S, b(t)_2 \oplus S, \ldots, b(t)_{P-1} \oplus S] \quad (6)$$

This one optimal sequence $\hat{S}$ is transmitted from the transmitting side to the receiving side of the telecommunications system, thereby minimizing the power absorption of the optical source. In fact, in an on-off keying format, optical power is transmitted only when a logical "1" is transmitted. Minimizing the number of "1" in the data stream fed to the transmitter 10 thus minimizes power absorption.

This result is preferably achieved by means of two identical finite state machines (FSMs) having a number $2^M$ of internal states. These finite state machines are provided on the transmitting and receiving side of the transmission link. Each internal state of the finite state machines is linked to a particular attempt sequence $S_n$. When the internal state of finite state machine on the transmitting side corresponds to the optimal sequence $\hat{S}$, a synchronization pulse SYP signal is generated towards the finite state machine on the receiving side.

When receiving the synchronization pulse SYP, such finite state machine reads its internal state and decides the sequence transmitted.

Such an operation method of the finite state machine will be better understood with reference to the following explanation with respect to the synchronization pulse SYP, the internal state of the finite state machine and the optimal sequence $\hat{S}$ in function of time. The synchronization pulse SYP is issued a first time in correspondence of the state linked to attempt sequence $S_2$, therefore the optimal sequence $\hat{S}$ at the receiver is $S_2$, till reception of a new synchronization pulse SYP, issued in correspondence of the state linked to attempt sequence $S_1$, that therefore is the new value assumed by the optimal sequence $\hat{S}$.

The architecture proposed for implementing the bus encoding method will now be described in detail with reference to FIGS. 4 to 8.

In the system of FIG. 4 an encoder 2000 is associated to the transmitter 10 and placed upstream the parallel-to-serial converter 12 to receive the input data stream b(t), outputting the coded data stream B(t) and the synchronization pulse SYP signal.

A decoder 3000 is symmetrically arranged in the receiver 20 downstream of the serial-to-parallel converter 24 to receive the coded data stream B(t) and the synchronization pulse SYP signal.

The synchronization pulse SYP is transmitted over a suitable cascade of laser driving device 14", laser diode 15", optical fiber 16", photodetector 21", amplifier 22" and comparator 23".

Again, those of skill in the art will appreciate that the fibers 16, 16', 16" may in fact be the same fiber with the optical source/photodetector pairs 15, 21; 15', 21'; and 15", 21" operating at different wavelengths according to what is currently known as a WDM (Wavelength Division Multiplex) format.

In FIG. 4 a prescaler 4000 is also shown, arranged downstream the comparator 23' that processes the clock signal CK. The prescaler 4000 converts the frequency $Nf_0$ to a scaled frequency f in order to recover the frequency for a finite state machine that will be shown in the following part of the description.

Figure 5:
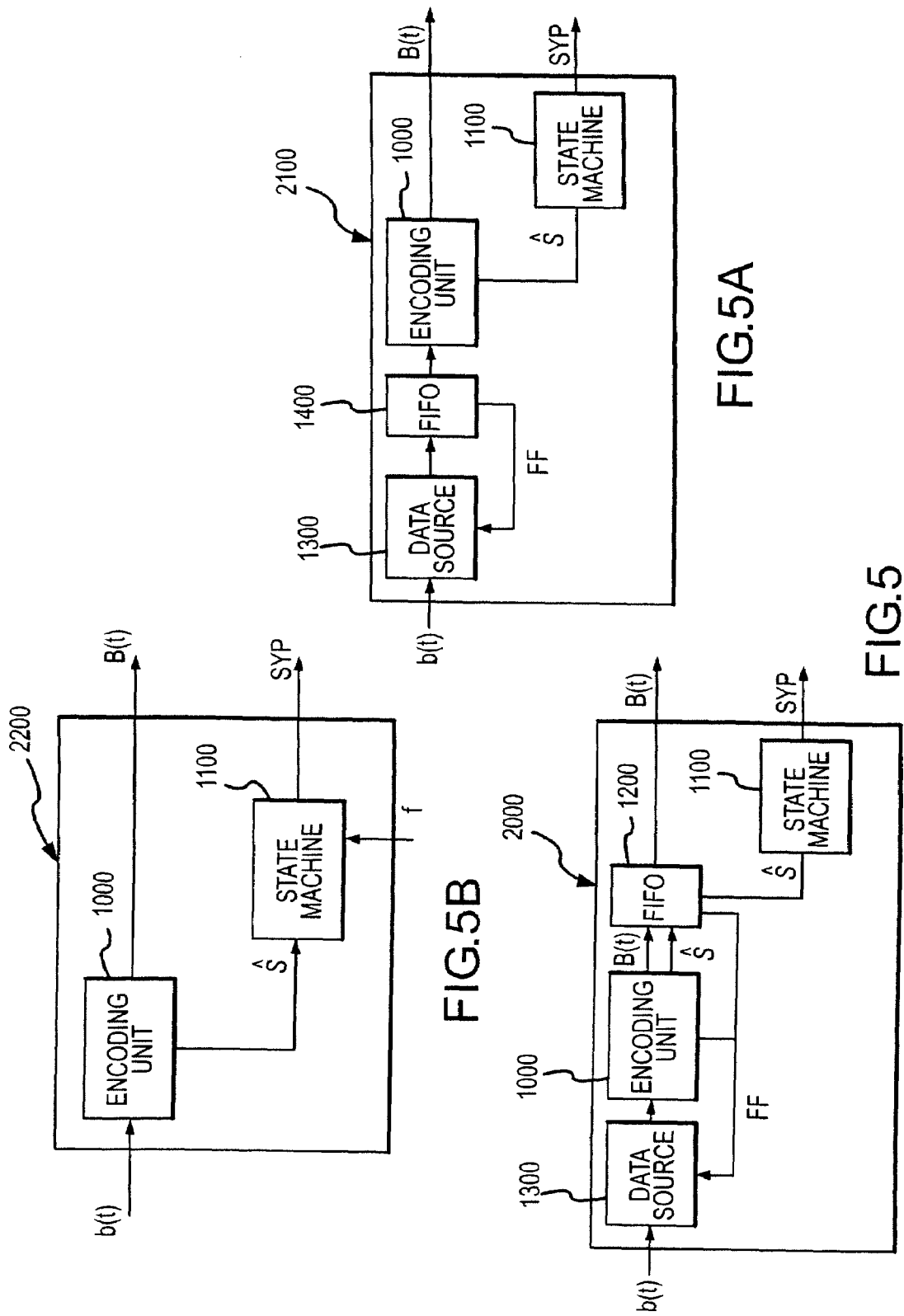

In FIG. 5 the detail of the encoder 2000 is shown, comprising an optical bus encoding module 1000, that performs coding of input data stream b(t) and sends the optimal sequence $\hat{S}$ obtained during the coding to a finite state machine 1100, that receives the optimal sequence $\hat{S}$ and generates the synchronization pulse SYP.

The encoder 2000 shown in FIG. 5 is based on a FIFO forward architecture, for handling the case where the frequency of the finite state machine 1100 is less than $2^M$ times the frequency $f_0$ of the electrical bus. A FIFO device 1200 is used to avoid stopping the optical bus encoding unit 1000. Such a FIFO device 1200 is placed downstream the optical bus encoding unit 1000, while upstream the optical bus encoding unit 1000, an input data source 1300 is shown that controls the data flow driven by a FIFO full signal FF.

In FIG. 5A a variant 2100 to the encoder 2000 is shown, having a FIFO backward architecture. There a FIFO device 1400 is placed upstream the optical bus encoding unit 1000, between the optical bus encoding unit 1000 and the source 1300.

In FIG. 5B a further embodiment 2200 of the encoder is shown, configured for the case where the clock frequency of the finite state machine is $2^M$ times faster than the frequency $f_0$ of the clock of the electrical bus. In this case the transmitter is able to send the optimal sequence $\hat{S}$ in one bus clock cycle. Thus the finite state machine 1100, clocked by the scaled frequency f, receives the optimal sequence $\hat{S}$ from the optical bus module 1000 and generates the synchronization pulse SYP.

The optical bus encoding unit 1000 comprises encoder core units 1010 for performing the task of coding the input data stream b(t) according to the relationship (5).

Figure 6:
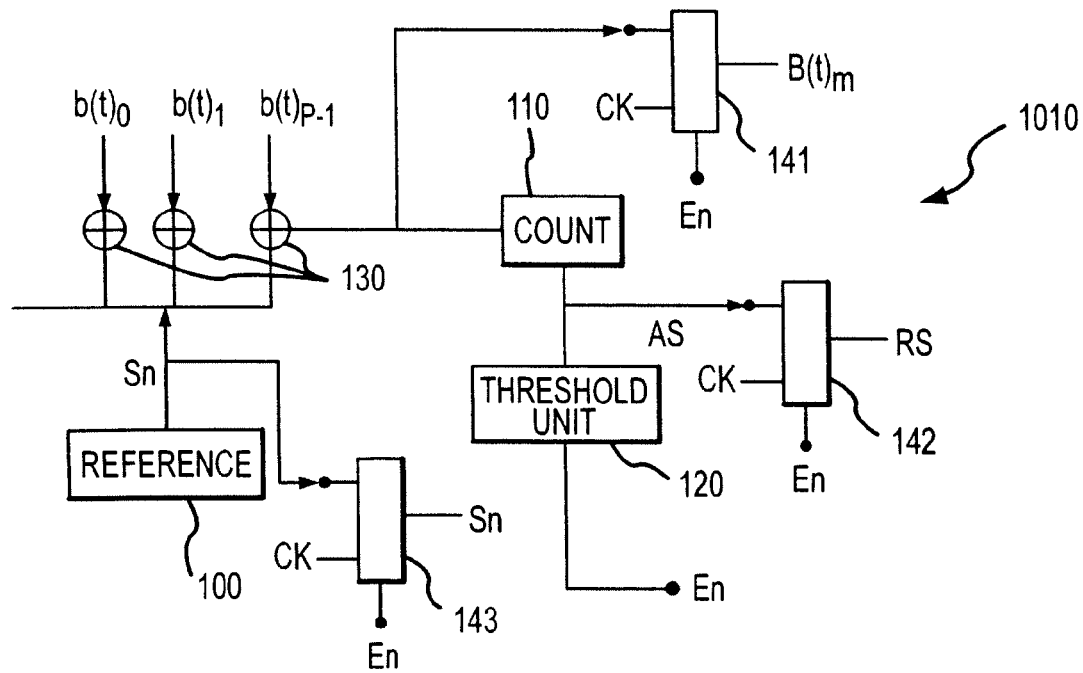
FIGS. 6 and 7 are detailed block diagrams of certain elements shown in FIG. 5.

In FIG. 6 such an encoder core unit is shown and indicated with reference 1010. Such an encoder core unit 1010 performs a number $Q = 2^M/L$ of attempts to determine the optimal sequence $\hat{S}$ that reduces the number of logical "1s". L indicates the level of parallelism that is implemented.

Reference 100 denotes a finite state machine that generates the attempt sequences $S_n$ and feeds it to a plurality of nodes 130 performing the XOR function with the clustered input data stream $b(t)_0, \ldots, b(t)_m$ in order to obtain the output $B(t)_m$ according to relation (5). A unit 110 counts the number of ones in the encoded data of the $B(t)_m$ supplying an actual score AS value to a threshold unit 120 that checks if the actual score AS is less than a registered score RS in a suitable register 142.

In this case an enable signal En is generated storing the output $B(t)_m$ in a register 141, the score AS as registered score RS in the register 142 and the sequence $S_n$ in a register 143. Registers 141, 142, 143 also receive the clock signal CK.

To improve performance of the encoder unit 1000, a maximum level of parallelism architecture could be used, where Q=1 and the core unit 1010 makes one attempt of measuring the number of ones in the encoded sequence. In this case the units 100 and 120 are not present with respect to the structure shown in FIG. 6 for unit 1010.

Figure 7:
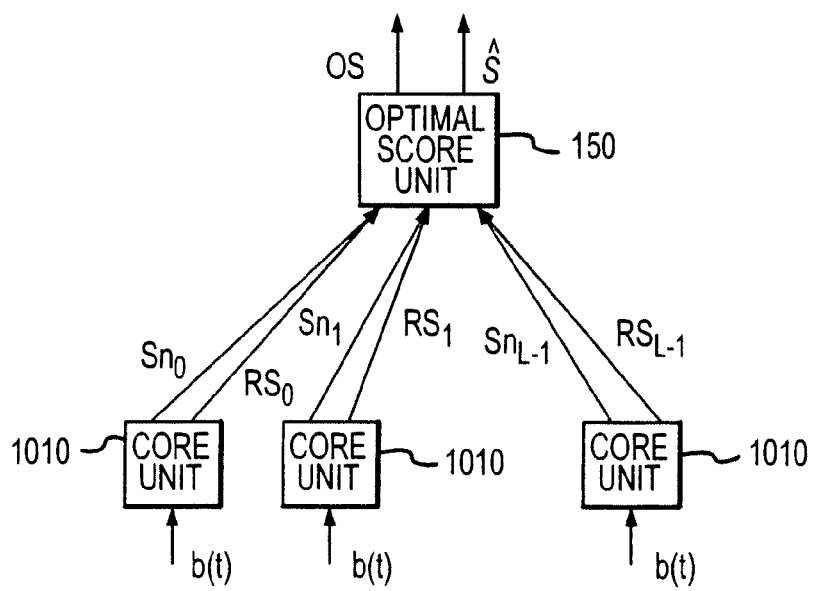

In general, with a given level of parallelism L, the top level of the optical bus encoding unit 1000 is structured as shown in FIG. 7.

A number l of instances of the encoder core unit 1010, being an index varying from 0 to L−1. Each encoder core unit 1010 generates a respective "best" sequence that minimizes the number of ones in the input data stream b(t) and the relative registered score $RS_l$. A unit 150 receives for each core unit 1010 the registered score $RS_l$ and the sequence $SN_l$ and outputs the sequence with a optimal score OS, that is the optimal sequence $\hat{S}$.

Figure 8:
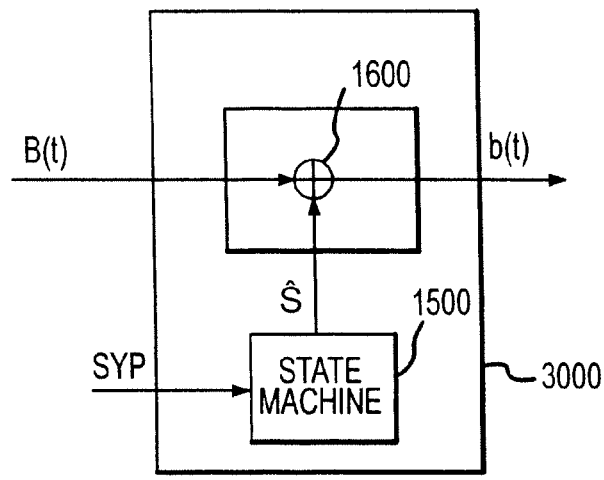
FIG. 8 is block diagram of a decoder adapted for use in the system of FIG. 4.

In FIG. 8 the decoder 3000 on the receiving side is shown. Such decoder 3000 comprises a node 1600 where the XOR operation between the coded data stream B(t) and the optimal sequence $\hat{S}$, generated by a finite state machine 1500, is performed when the synchronization pulse SYP is received.

The finite state machine 1100 on the transmitting side and the finite state machine 1500 on the receiving side are essentially identical, with the exception of the part regarding the synchronization pulse SYP, that is generated by the finite state machine 1000 and detected by the finite state machine 1500.

It was observed that, in such a system, the sequence $S_0$ that contains all zeros (i.e. absence of coding) is chosen and transmitted a remarkable number of times.

Therefore, in order to improve performance, advantageously the link of such a sequence $S_0$ is moved to the last state of the finite state machines 1100 and 1500, instead of being the first state, as it would be natural. This allows for an automatic implicit acknowledgment of the sequence $S_0$ if the finite state machine reaches its last state without receiving any impulses in the synchronization pulse SYP during the passage through the previous states. Such a solution advantageously allows for increasing the performance of the systems in term of laser power saving.

According to a second solution, a system is proposed that implements a bus inverted method on the optical bus, in which the sequence of coded data (B(t) is defined as follows:

$$[B(t), INV] = \begin{cases} b(t), 0 & Z[b(t)] < N/2 \\ \overline{b(t)}, 1 & \text{otherwise} \end{cases} \quad (7)$$

where Z designates a zero-count function applied to the input data stream b(t).

Figure 9:
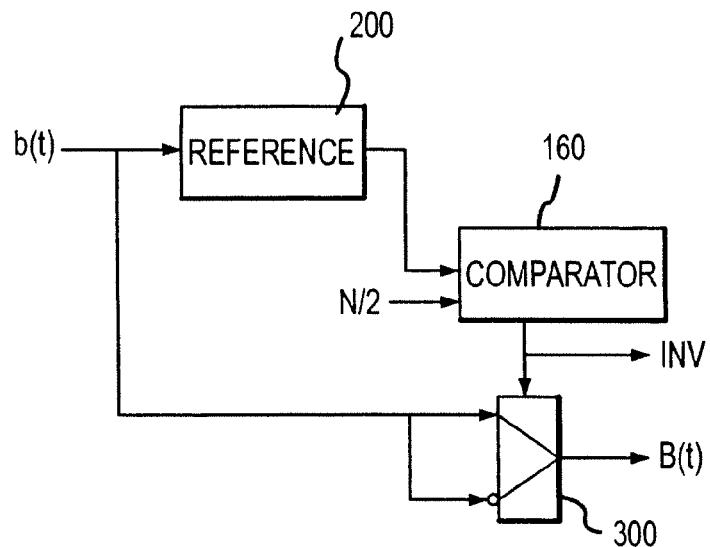
FIGS. 9 and 10 are block diagrams related to a possible variant to the system of FIG. 4.
Figure 10:
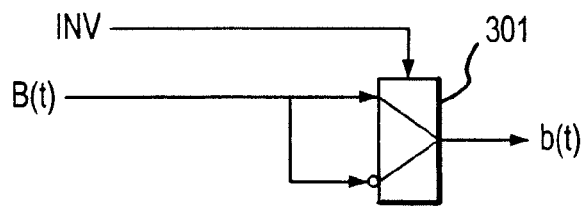

In FIG. 9 an encoder circuit for implementing such an optical bus inverted procedure is shown. In FIG. 10 the corresponding decoder circuit is shown.

There, the input data stream b(t), not encoded, is sent to a block indicated with the reference 200 that performs a complemented one count function. The output of the block 200 is sent to one of the inputs of a binary comparator 160, to which the value N/2 is sent as the other input. The comparator 160 thus generates the inversion signal INV.

The signal INV is sent on the channel constituted by the optical fibers. The signal INV is also sent as a select signal to a multiplexer 300, that receives to its two inputs the input data stream b(t) and its negated (i.e. binary complementary) version. The multiplexer 300 supplies at the output the coded data stream B(t). Therefore, by means of the block 200 the zeros of the input data stream b(t) are counted, by implementing the zero-count function Z in view of comparison with the value N/2 according to the relationship (7).

In the receiver a decoder circuit is provided comprising another multiplexer 301, receiving as its inputs the encoded data stream B(t) and its negated version. The multiplexer 301 supplies at its output the correct data stream b(t) decoded under the control of the inversion signal INV.

The arrangements disclosed herein lead to significant advantages over the known solutions in that they may reduce power consumption of an optical source such as a laser source used e.g. in an on-chip optical communication system up to 20%.

The arrangements disclosed herein are related to serial synchronous optical buses, but they can be easily applied to parallel systems operating at lower frequencies (i.e. bit rates).

The parallel architecture for an optical bus can be used in modern optical connections at the chip level, where no limits exist to implementing several optical lines in a wafer, while the serial optical bus could be used as communication interface between different chips.

It is also clear that the optimal sequence $\hat{S}$ that leads to the maximum number of logical high states in the N lines of the parallel input data stream b(t)) being "erased" can be identified via functional combinations other than the described XOR operation, between the binary sequences $S_n$ and clusters $b(t)_m$.

An arrangement has been described for transmitting over an optical link a data stream (b(t)) including first (i.e. high "1") and second (i.e. low "0") logical states. The arrangement provides an optical source adapted to be driven via said data stream for generating an optical signal for transmission the optical link wherein the optical signal includes optical pulses generated at the occurrence of the first (i.e. high "1") logical states in the data stream.

It will thus be appreciated that the input data stream in question is the one having high logical states that correspond to optical pulses being generated by the optical source. Such a data stream may possibly derive from a different data stream having a different arrangement of logical states, this failing to have any impact on the basic concept of the invention, namely coding the input data stream in order to minimize the logical states in correspondence to which optical pulses are generated by the optical source.

It is therefore evident that without prejudice to the underlying principle of the invention, the details and embodiment may vary, also significantly, with respect to what has been disclosed just by way of example without departing from the scope of the invention, and defined by the claims that follow.

The off state in the on-off modulation associated of the laser source can provide for a minimal emission of optical power even in the zero or low logical state. Transmitting a small amount of power even when a zero has to be transmitted allows for obtaining a laser source with faster response to logical transitions. Also, terms such as "optical", "light", "photosensitive", and the like are evidently used herein with the meaning currently allotted to those terms in fibre and integrated optics, being thus intended to apply to radiation including, in addition to visible light, e.g. also infrared and ultraviolet radiation.

We claim:

1. A method of transmitting over an optical link an input data stream including first and second logical states, the method comprising:

providing an optical source for generating an optical signal for transmission over said optical link, wherein said optical source is adapted to generate optical pulses at the occurrence of said first logical states;

coding said input data stream into a coded data stream prior to the transmission over said optical link, by arranging said input data stream in a parallel format in a plurality of clusters over a respective plurality of lines, erasing a maximum number of logical first states in the lines of said input data stream in said parallel format and thus minimizing the first logical states in said coded data stream, generating a plurality of binary sequences, performing an XOR operation between each said cluster and each binary sequence and generating corresponding results, and searching said results to find an optimal sequence among said binary sequences that leads to the maximum number of first logical states being erased in said data stream; and driving said optical source by means of said coded data stream wherein the number of first logical states has been minimized.

2. The method of claim 1 further comprising:
providing said input data stream in a parallel format;
converting said input data stream from the parallel to a serial format; and
driving said optical source by using said data stream converted to said serial format.

3. The method of claim 2, further comprising:
transmitting said optical signal over said optical link;
receiving said optical signal transmitted over said optical link to produce a received data stream; and
decoding said received data stream.

4. The method of claim 3, further comprising generating an additional signal for sending over said optical link, said additional signal being indicative of a corresponding portion of said input data stream having been coded.

5. The method of claim 4, wherein coding said input data stream comprises:
arranging said input data stream in a parallel format over a number of bus lines;
counting the first logical states in said input data stream over said number of bus lines;
comparing the result of said counting with a value being half the number of said bus lines; and
logically inverting said input data stream over said number of bus lines if the result of said counting step is higher than the value representing the half of the lines of the input data stream.

6. The method of claim 5, further comprising generating said additional signal if the result of said counting step is higher than the value representing half of the lines of the input data stream.

7. The method of claim 1, wherein coding said input stream further comprises:
cycling through said binary sequences; and
generating said additional signal as a synchronisation signal upon passing said optimal sequence during said cycling.

8. The method of claim 7, wherein decoding said received data stream further comprises:
cycling identically through said binary sequences; and
selecting the optimal sequence for decoding from the cycling binary sequences in correspondence of the reception of the synchronization signal.

9. The method of claim 8, wherein if during said step of cycling identically through said binary sequences said synchronization signal is not received, then reception of a sequence representing absence of coding is automatically acknowledged.

10. The method of claim 1, further comprising:
transmitting said optical signal over said optical link;
receiving said optical signal transmitted over said optical link to produce a received data stream; and
decoding said received data stream.

11. The method of claim 1, further comprising generating an additional signal for sending over said optical link, said additional signal being indicative of a corresponding portion of said input data stream having been coded.

12. The method of claim 1, wherein coding said input data stream into a coded data stream comprises:
arranging said input data stream in a parallel format in a plurality of clusters over a respective plurality of lines; and
erasing a maximum number of logical first states in the lines of said input data stream in said parallel format.

13. A system for of transmitting over an optical link a data stream including first and second logical states, comprising:
an optical source adapted to generate an optical signal for transmission over said optical link wherein said optical signal includes optical pulses at the occurrence of said first logical states; and
a coder for coding said input data stream into a coded data stream prior to the transmission over the optical link, said coder being configured to minimize the number of first logical states in said data stream,
whereby said optical source is driven by said coded data stream wherein the number of said first logical states has been minimized by
arranging said input data stream in said parallel format, in a plurality of clusters over a respective plurality of lines,
erasing a maximum number of said first logical states in the lines of said input data stream in said parallel format, thus minimizing the first logical states in said coded data stream,
generating a plurality of binary sequences,
performing a XOR operation between each said cluster and each binary sequence and generating corresponding results, and
searching among said binary sequences that lead to the maximum number of said first logical states being erased in said data stream.

14. The system of claim 13, further comprising:
a converter for converting said input data stream from the parallel to a serial format; and
a driver for said optical source, said driver operable by said data stream converted to said serial format.

15. The system of claim 14, further comprising:
a receiver for receiving said optical signal transmitted over said optical link to produce a received data stream; and
a decoder for decoding said received data stream.

16. The system of claim 15, further comprising:
a driver configured for sending over said optical link an additional signal indicative of said first logical states having been minimized in a corresponding portion of said input data stream by said coder.

17. The system of claim 16, wherein said coder is configured for:
arranging said input data stream in a parallel format over a number of bus lines;
counting the said first logical states in said input data stream over said number of bus lines;

comparing the result of said counting with a value being half the number of said bus lines; and logically inverting said input data stream over said number of bus lines if the result of said counting step is higher than the value representing the half of the lines of the input data stream.

18. The system of claim 17, wherein said coder is configured for generating said additional signal if the result of said counting step is higher than the value representing the half of the lines of the input data stream.

19. The system of claim 13, wherein said coder is further configured for:

cycling through said binary sequences;

generating said additional signal as a synchronisation signal upon passing said optimal sequence during said cycling.

20. The system of claim 19, wherein said decoder is configured for:

cycling identically through said binary sequences;

selecting the optimal sequence for decoding from the cycling binary sequences in correspondence of the reception of the synchronization signal.

21. The system method of claim 20, wherein said decoder is further configured for automatically acknowledging reception of a sequence representing absence of coding in the absence of reception of synchronization signal during said step of cycling.

22. The system of claim 13, further comprising:

a receiver for receiving said optical signal transmitted over said optical link to produce a received data stream; and a decoder for decoding said received data stream.

23. The system of claim 13, further comprising:

a driver configured for sending over said optical link an additional signal indicative of said first logical states having been minimized in a corresponding portion of said input data stream by said coder.

24. The system of claim 13, wherein said coder is configured for:

arranging said input data stream in said parallel format, in a plurality of clusters over a respective plurality of lines; and erasing a maximum number of said first logical states in the lines of said input data stream in said parallel format.

* * * * *